Feb. 19, 1946.　　　　M. E. SOHN　　　　2,395,351
NAVIGATING DEVICE
Filed July 30, 1942　　　3 Sheets-Sheet 1

INVENTOR
MARION E. SOHN
BY
Toulmin & Toulmin
ATTORNEYS

Feb. 19, 1946.  M. E. SOHN  2,395,351
NAVIGATING DEVICE
Filed July 30, 1942  3 Sheets-Sheet 2

INVENTOR
MARION E. SOHN
BY
Toulmin & Toulmin
ATTORNEYS

Feb. 19, 1946.     M. E. SOHN     2,395,351
NAVIGATING DEVICE
Filed July 30, 1942     3 Sheets-Sheet 3

INVENTOR
MARION E. SOHN
BY
Toulmin & Toulmin
ATTORNEYS

Patented Feb. 19, 1946

2,395,351

UNITED STATES PATENT OFFICE 2,395,351

NAVIGATING DEVICE

Marion E. Sohn, Seattle, Wash.

Application July 30, 1942, Serial No. 452,953

17 Claims. (Cl. 73—178)

This invention relates to navigation instruments.

An object of the invention is to provide an apparatus that will automatically chart a course of a craft so that an operator of the craft will know his position at all times.

Another object of the invention is to provide an apparatus that will automatically chart the course of a craft and will transmit the course to a receiving station so that the course of the craft can be followed.

Another object of the invention is to provide a navigating instrument for automatically charting the course of a craft and including mechanism for compensating for the velocity of movement of the medium in which the craft is moving.

Another object of the invention is to provide a navigating instrument for automatically plotting the course of a craft that includes mechanism for compensating for vertical motion of the craft so that a true forward motion will be produced upon the charted course.

It is still another object of the invention to provide a navigating instrument for automatically plotting a course of a craft that is associated with a plotting device in a manner that the plotting point follows the true course and speed of the craft.

Another object of the invention is to provide a navigating instrument that is driven at a speed proportional to the true speed of the craft and is controlled in its actuation of its plotting device by means of a gyroscopic compass in a manner that the actuating mechanisms for the plotting device are driven at speeds proportional to the true speed of the craft in accordance with the sine and cosine of the angle of deviation as indicated by the gyroscopic compass.

It is another object of the invention to provide a navigating instrument in accordance with the foregoing object wherein the true speed of rotation of the actuating mechanism of the instrument is compensated for wind velocity when the device is used upon aircraft.

It is another object of the invention to provide a navigating instrument for plotting direction of movement and distances traveled by a craft as controlled by a gyroscopic compass indicating direction of movement of the craft and speed of movement of the craft, and to compensate the navigating instrument for velocity of movement of the medium in which the craft is traveling and for vertical movement of the craft, whereby a true forward position and direction can be plotted upon a chart to indicate to the operator his exact position at all times, and which may be transmitted to a receiving station to determine the position of the craft at the receiving station.

Further objects and advantages will become apparent from the drawings and the following description.

Figure 1:
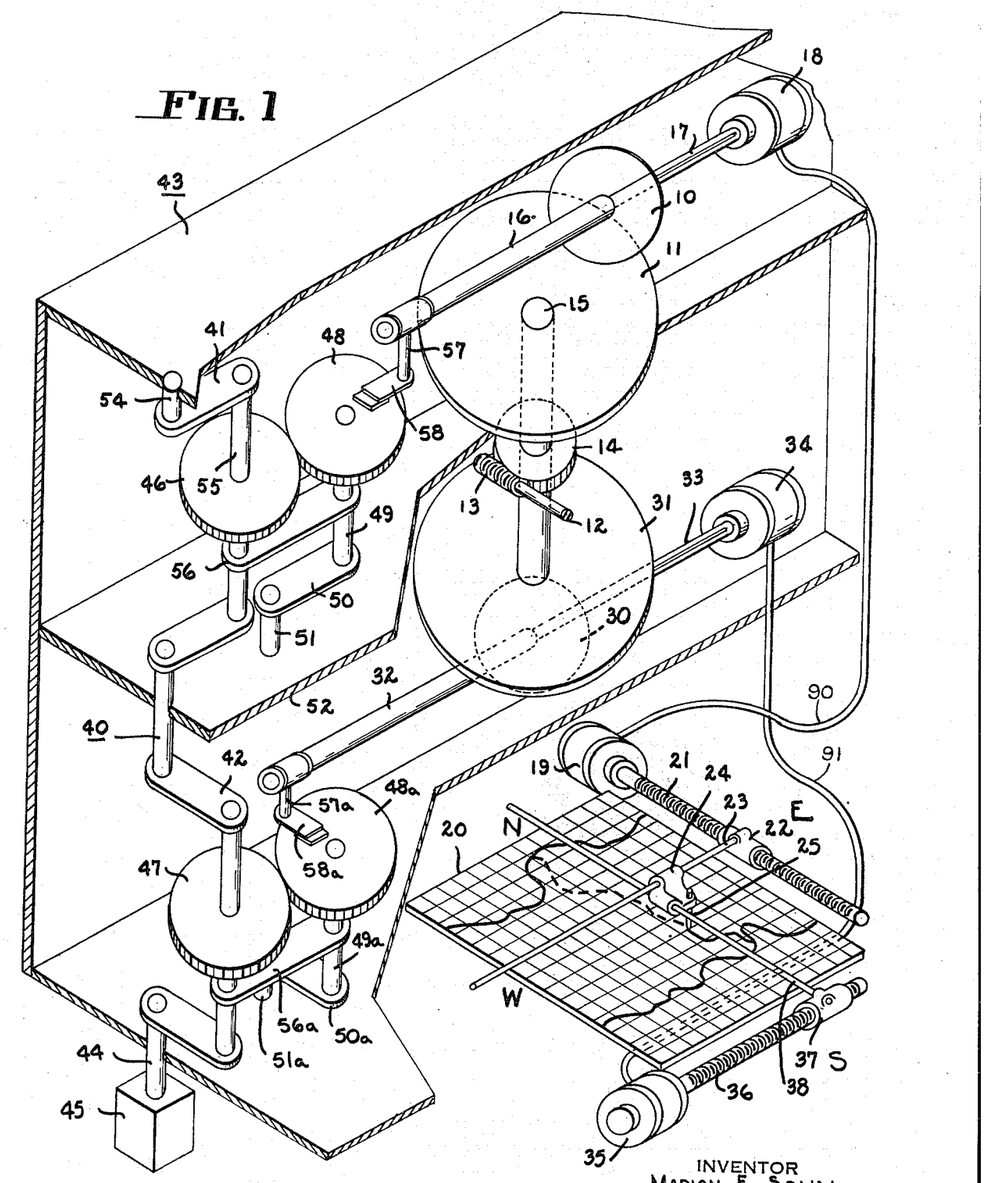
Fig. 1 is a perspective cross-sectional view of a navigating instrument showing the operating mechanism in elevation and associated with a plotting or charting instrument.

In this invention a planimeter type wheel 10 is driven by a disc 11, which disc 11 is rotated at a speed proportional to the speed of the craft by means of a drive shaft 12 having a worm 13 driving a worm wheel 14 secured to a shaft 15 upon which the disc 11 is mounted. The wheel 10 drives a hollow tube 16 in which a shaft 17 is keyed or splined so that the tube 16 can move axially over the shaft 17 to adjust wheel 10 radially of disc 11. The shaft 17 drives a transmitter 18 of any known type such as a "Selsyn" or "Autosyn."

"Selsyn" 18 is connected to a Selsyn repeater motor 19 that is associated with a plotting or charting surface 20. The "Selsyn" motor 19 drives a screw 21 that carries a sleeve 22 in threaded engagement therewith having a rod 23 extending therefrom for engaging a pointer bracket 23 having a pointer 25 for moving the pointer bracket across the table 20.

A second planimeter type wheel 30 is driven by a disc 31 carried on the opposite end of the shaft 15 and rotated at the same speed as the disc 11. The wheel 30 drives a hollow tube 32 that receives a shaft 33 which is keyed or splined within the tube 32 for driving the shaft 33 thereby. The shaft 33 drives a transmitter 34 of any known type such as a "Selsyn" or "Autosyn" a repeater motor 35 associated with the plotting table or surface 20. The Selsyn motor 35 drives a screw 36 having a sleeve 37 in threaded engagement therewith which carries a rod 38 extending through the pointer bracket 24 at right angles to the rod 23.

The screws 21 and 36 associated with the plotting table 20 are at right angles to one another so that their relative speeds of rotation will produce a predetermined course of travel of the pointer 25 across the table 20 as controlled by the navigating instrument in a manner to be hereinafter described. The charting table 20 can be plotted in longitude and latitude so that the pointer 25 will indicate the exact position of the craft carrying the navigating instrument or a map can be placed upon the table 20 so that the pointer will indicate the position on the map occupied by the craft as well as in terms of longitude and latitude.

The planimeter type wheels 10 and 30 are movable across their respective driving discs 11 and 31 radially through the axis of rotation of the discs. When the wheel 10 is disposed at its maximum position adjacent the periphery of the disc 11, the wheel 30 will have its point of contact upon the disc 31 coincident with the axis of rotation of the disc 31, whereby the wheel 10 will be rotated at maximum speed while the wheel 30 is stationary. Under such conditions the wheel 10 is producing rotation of the screw 21 associated with the plotting table 20 at maximum speed as transmitted thereto by the Selsyn motors 18 and 19, while the wheel 30 causes the screw 36 to remain stationary because the Selsyn motors 34 and 35 associated therewith are not being rotated. Therefore, the tracing pointer 25 will take a straight line course parallel with the screw 21, and in this instance can be assumed to be a true north south direction. The screw 36 being inactive will not move the pointer 25 in east west direction.

The direction of movement of the pointer 25 on the plotting table 20 with respect to north south directions depends upon the direction of rotation of the wheel 10. When the craft is headed north, the wheel 10 will be on one side of the axis of rotation of disc 11 at a radial distance from said axis proportional to the relative component of craft speed in the N-S direction and motor 19 is driven at a proportional speed to translate pointer 25 in a direction indicated as north upon table 20 and at a rate proportional to craft speed. When the heading is south, the wheel 10 is shifted, by mechanism later to be described, to the other side of the axis of rotation of disc 11 thus reversing the direction of rotation of wheel 10 transmitter 18 and repeater 19 and causing pointer 25 to travel in a direction indicated as south upon said table at a rate proportional to craft speed. The wheel 30 controls movement of the pointer 25 in the E-W direction upon surface 20 by reversing the direction of rotation of the screw 36 that is when the craft is on an eastward course, the wheel 30 is on one side of the axis of rotation of disc 31 at a radial distance therefrom proportional to the relative component of craft speed in an E-W direction and repeater 35 is driven in the proper direction to move pointer 25 a direction indicated as east upon surface 20. When the craft is travelling west, wheel 30 is shifted, by means subsequently to be described, to the other side of the axis of rotation of disc 31 and the rotations of transmitter 34 and repeater 35 are reversed and pointer 25 is caused to move in a direction indicated as west upon said surface. Under these conditions, of course, that is, when the craft is headed true east or true west, the wheel 10 makes contact with disc 11 on the axis of rotation of the latter, and no movement of parts 10, 18, and 19 takes place, when the position of the craft changes from an easterly to a westerly direction and vice versa. It may thus be seen that when the discs 11 and 31 are driven at a constant speed and the wheels 10 and 30 are driven at proper speeds in proportion one to the other that the plotting pointer 25 will be moved across a table 20 in a vector that is a resultant of the coordinates represented by the respective rotations of screws 36 and 21.

To produce proper movement of the wheels 10 and 30 across their respective discs 11 and 31, a crankshaft 40 is provided having crank arms 41 and 42 disposed at right angles to one another. The crankshaft 40 is rotatably mounted in bearings in a case 43 that houses the navigating instrument. The crankshaft 40 is connected to a gyroscopic compass 45 which thereby retains the crankshaft 40 stationary in space when the craft carrying the navigating instrument alters its course. The crank arm 41 carries a gear 46 that is secured to the arm 41 through a shaft 55 and therefore stationary with respect to the same. The crank arm 42 carries a similar gear 47 that is stationary with respect to the arm 42.

A gear 48 of the same pitch diameter as the gear 46 meshes therewith and is rotatably carried upon a shaft 49 secured to a link 50 carried upon a stub shaft 51 rotatably mounted in the wall 52 of the case 43. The distance between the axes of the shafts 51 and 49 is equal to the distance between the axis of the bearing shaft 54 of the crankshaft 40 and the axis of the shaft 55 carrying the gear 46. A pantograph link 56 connects the shaft 55 with the shaft 49 so that a line through the axes of the gears 46 and 48 is always maintained parallel to the radial line of travel of the wheel 10 across the disc 11. The tube 16 that carries the disc 10 is connected to the gear 48 by means of a shaft 57 and a bracket 58 so that the axis of the shaft 57 is on the pitch diameter of the gear 48 which therefore is positioned radially with respect to the axis of the gear 48 so that the distance between the axis of the gear 48 and the axis of the shaft 57 is equal to the distance between the axis of the bearing shaft 54 of the crankshaft 40 and the axis of the shaft 55 that carries the gear 46.

The wheel 30 is driven by a mechanism identical with the gear and pantograph link mechanism just described and is associated with the crank arm 42, and therefore the identical parts of the mechanism associated with the crank arm 42 can be identified with the same numerals as referred to with the same mechanism associated with the crank arm 41 with the addition of the suffix a. However, the crank arm 42 is disposed 90° ahead of the crank arm 41 and therefore the mechanism associated therewith is 90° ahead of the mechanism associated with the crank arm 41. The arrangement is thus such that as shown in Fig. 1, the wheel 10 is in full extended radial position upon the disc 11 so that the Selsyn motor 18 is being driven at maximum speed while the wheel 30 is disposed with its point of contact coincident with the axis of the shaft 15 and therefore the Selsyn motor 34 is not being rotated. As previously referred to the discs 11 and 31 are rotated at a speed proportional to the speed of the craft in which the navigating instrument is placed. The drive shaft 12 can be driven from the tachometer, speedometer drive shaft or other speed responsive part for driving the discs at a speed that is directly proportional to the actual speed of the craft. With the device positioned as shown in Fig. 1, it can be assumed that the craft is moved in a true northerly direction as previously referred to and therefore the movement of the tracing pointer 25 will be in a true northerly direction and will be moved at a speed in direct proportion to the speed of movement of the craft so that if the chart upon the plotting table 20 is properly scaled the actual movement of the craft will be plotted on the chart at the true speed of forward movement.

Figures 2, 6, 7, 8, 9, 10:
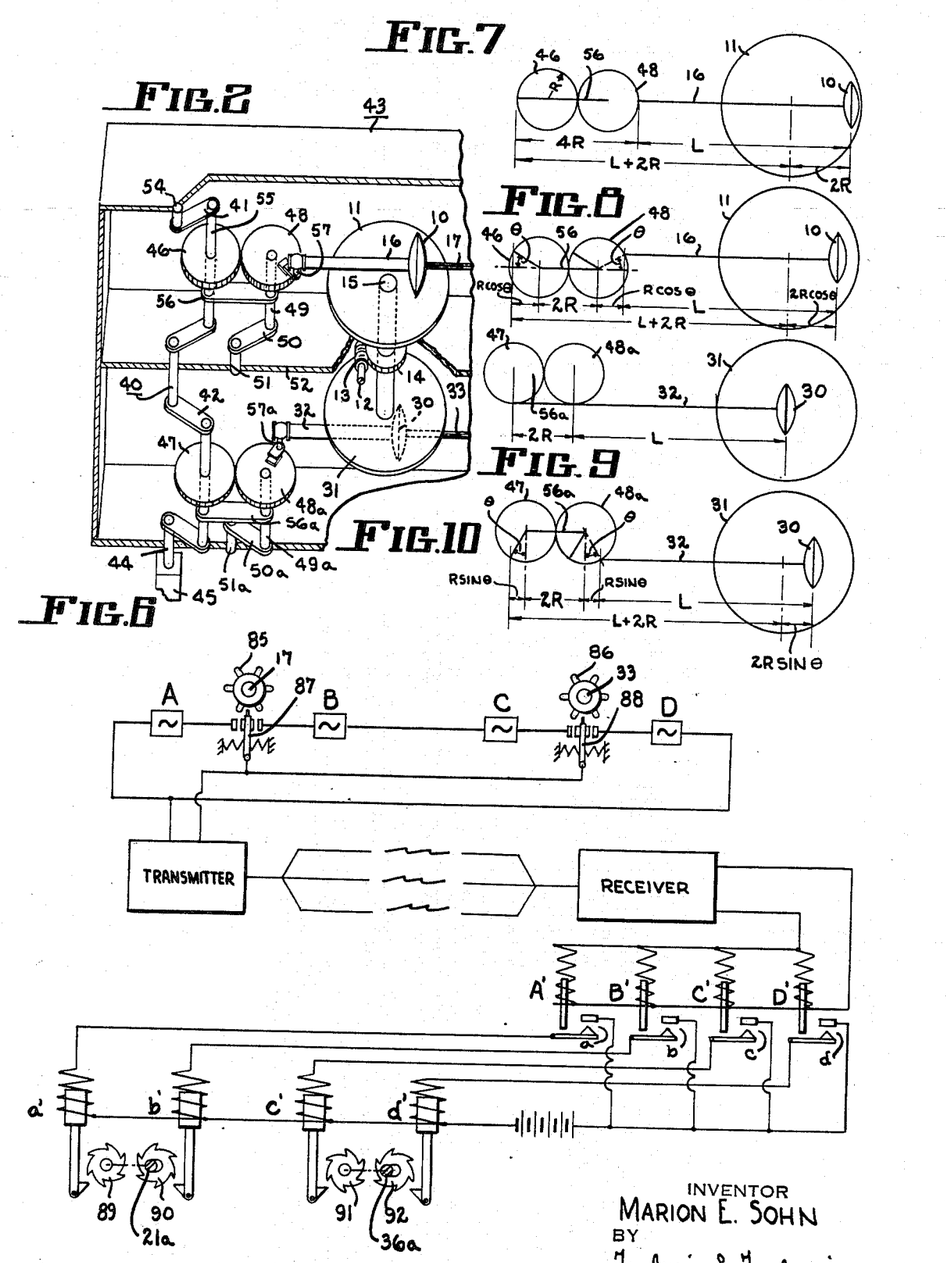
Fig. 2 is a perspective cross-sectional view similar to Fig. 1 showing the mechanism in one of its other positions.
Fig. 6 is a schematic view of a system for transmitting the plotting data from the navigating instrument to a receiving station for plotting the results upon a suitable chart.
Figs. 7 and 8 are diagrammatic representations of one of the mechanisms of the navigating instrument to show the trigonometric functions involved in the apparatus.
Figs. 9 and 10 are diagrammatic representations of the apparatus cooperating with that disclosed in Figs. 7 and 8 but positioned at right angles thereto for showing the trigonometric functions involved in this corresponding piece of apparatus.

If the craft should veer from a true northerly course, then it is necessary to reduce the speed of rotation of the wheel 10 and begin rotation of the wheel 30 so that the vector produced by the relative rotations of the screws 36 and 21 on the plotting table 20 will cause the pointer 25 to assume a new course of travel in the new direction and at a speed proportional to the speed of the craft. When the craft veers from the true northerly course, the crankshaft 40 will remain stationary in space because it is attached to a gyroscopic compass. In effect, therefore the case 43 of the navigating instrument rotates about the crankshaft 40 so that the shafts 51 and 51a rotate about the crankshaft bearing shaft 54 as a center of rotation so that the pantograph link mechanism associated with the crank arms 41 and 42 assume new positions relative one to the other as shown in Fig. 2. However, it will be noted that a line through the axes of the gears 46 and 48 remains parallel to the line of travel of the wheel 10 radially across the disc 11. When the gears 48 and 48a rotate about the gears 46 and 47 they also rotate upon their axes in a clockwise manner so that the wheel 10 is moved radially inwardly toward the axis of the disc 11 while the wheel 30 is moved radially outwardly from the axis of the disc 31, therefore the speed of rotation of the wheel 10 is decreased while the speed of rotation of the wheel 30 is increased.

As shown in Figs. 7 and 8 the wheel 10 is moved inwardly of the disc 11 by an amount proportional to the cosine of the angle $\theta$ so that its speed of rotation will be decreased in proportion to the angle of deviation taken by the crank arm 41 as caused by the rotation of the frame 43 about the crankshaft 40. Since the crank arm 42 is disposed at right angles to the crank arm 41, the wheel 30 will be moved outwardly from the axis of rotation of the disc 31 by the sine of the angle $\theta$ as shown in Fig. 10, whereby the speed of rotation of the wheel 30 is increased in proportion to the angle of deviation taken by the crank arm 42.

In Fig. 7 the mathematical relationship of the various elements is set forth in an initial position representing due north travel as heretofore discussed, while in Fig. 8 there is shown the mathematical difference in the movement of the wheel 10. The distance across the gears 46 and 48 is equal to 4R. The distance between the shaft 57 and the center of the wheel 10 is indicated by L which is a fixed distance. Since the travel of the wheel 10 across the disc 11 to axial center and to the opposite side of the disc 11 is produced by the movement of the crank arm 41 from the position as shown in Fig. 1 to a position 180° therefrom, the dimension between the axis of the disc 11 and the center of the wheel 10 is equal to 2R. Therefore, the distance from the axis of the disc 11 to the outer perimeter of the gear 46 is equal to L+2R.

Assuming now that the crank arm 41 is in the new position shown in Fig. 8 thereby producing the angle $\theta$, the shaft 57 will therefore have been rotated about the gear 48 by the same angle $\theta$. In order to proportion the new speed of rotation of the disc 10 it shall have been moved inwardly toward the axis so that the new distance between the wheel 10 and the axis of the disc 11 is proportional to the cos $\theta$. The new distance for the crank arm 41 along the abscissa will be R cos $\theta$ while the new distance for the axis of shaft 57 along the abscissa will be R cos $\theta$. The distance between the axis of the gears 46 and 48 remains constant at 2R and L also remains constant. Since we are interested in the relative position of the wheel 10 with respect to the axis of the disc 11 to proportion the movement thereof in accordance with cos $\theta$, we, therefore, subtract the shorter distance L plus 2R cos $\theta$ which remains a constant from the new distance and we find that the result is 2R. However, since 2R is a constant the wheel 10 has moved radially upon the disc 11 by a distance proportional to cos $\theta$ and therefore its speed will be decreased in proportion to the cosine of the angle of deviation taken by the crank arm 41.

The same relationship can be set forth for the crank arm 42 as shown in Fig. 10, whereby the crank arm has moved through angle $\theta$. In this instance we are interested in the movement outward from the axis of the disc 31 which will be sine $\theta$. In this instance, in Fig. 9, R is the radius of the gears 47 and 48a while L is the same constant as previously referred to. Referring to Fig. 10 we find that crank arm 42 has moved a distance which would be R sine $\theta$ and the shaft 57a has also moved R sine $\theta$, therefore the new distance from the crank arm 42 to the shaft 57 becomes 2R plus 2R sine $\theta$, L remaining constant. Since we desire to know the movement of wheel 30 with respect to the axis of disc 31 we subtract the old distance from the new distance and find we obtain 2R sine $\theta$. Again, 2R remains a constant and therefore does not become a figure in the equation so that the wheel has moved a distance sine $\theta$ and has therefore had its speed of rotation increased proportional to the angle of deviation taken by the crank arm 42.

Therefore, since the wheels 10 and 30 have their relative speeds decreased and increased in proportion to cosine $\theta$ and sine $\theta$ the resultant vector produced upon the pointer 25 will be the true course of the craft and at the true speed.

Under certain conditions, particularly when the navigating instrument is used on aircraft there is necessity to compensate the device for the velocity of the medium in which the craft is moving. The device as constructed and arranged in Fig. 1 will accurately plot a course for horizontal movement of the craft and without any major slip of the craft with respect to the medium in which it is operating. However, in the case of aircraft the wind velocity plays a considerable part in the ground speed of the craft so that an apparatus should be provided for correcting the plotting device when the craft is moving through air that is moving at a substantial velocity relatively to the earth. A device to provide for such compensation is disclosed in Fig. 3. In this device the discs 60 and 61 are driven at a constant speed by suitable mechanism, which can be a power takeoff from the engine of the craft. Planimeter type wheels 62 and 63 are carried upon arms 64 and 65, respectively that are disposed at a right angle, the wheels 62 and 63 engaging the discs 60 and 61, respectively. The arms 64 and 65 extend through a cross member 66 that carries a pointer 67, the arms 64 and 65 being in slidable engagement with the cross member 66. Rods 68 and 69 extend through the arms 64 and 65, respectively, upon which they are adapted to slide so that the wheels 62 and 63 carried by their respective arms will be moved radially from the axis of the discs 60 and 61, respectively.

Figures 3, 4, 5:
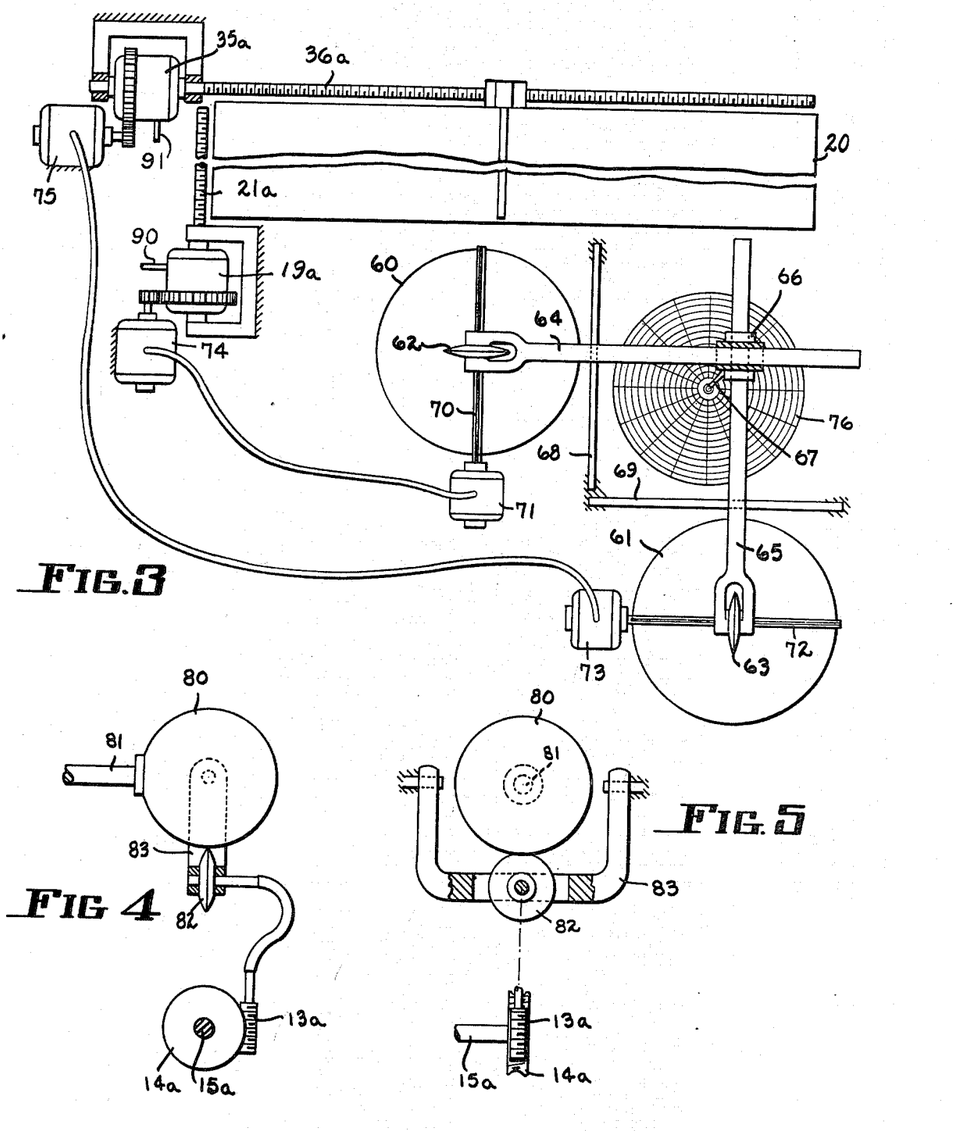
Fig. 3 is an elevational view, somewhat diagrammatic of an apparatus to compensate the navigating instrument shown in Fig. 1 for the velocity of movement of the medium in which the craft is moving.
Fig. 4 is an elevational view of an apparatus for compensating the navigating instrument of Fig. 1 for vertical movement of the craft.
Fig. 5 is a front view of the vertical movement compensating device taken along line 5—5 of Fig. 4.

The wheel 62 is slidably mounted upon a shaft 70 and is keyed or splined through for driving a Selsyn motor 71. The wheel 62 is similarly slidable upon a shaft 72 and keyed or splined through for driving a Selsyn motor 73.

The Selsyn motor 71 is connected to a Selsyn motor 74 that in turn drives the frame of the Selsyn motor 19a provided for driving the screw 21a of the plotting table 20. A Selsyn motor 75 is similarly driven by the Selsyn motor 73 for driving the frame of a Selsyn motor 35a which drives the screw 36a of the plotting table 20.

It is clear that in a situation, for example, where an aircraft is heading north at 200 M. P. H. and there is a northerly wind of 30 M. P. H., that the ground speed of the craft will be 170 M. P. H. And, in general, to get the true ground speed on any heading, it is necessary merely to decompose the air speed into N-S and E-W components, similarly decompose the wind velocity into N-S and E-W components algebraically add the two N-S components to get the N-S component of ground speed to algebraically add the two E-W components, to get the E-W component of ground speed, then derive the resultant of the two said components to get the ground speed both in value and direction.

This function is performed in a smooth, precise manner by the apparatus disclosed in Figure 3. It will be understood that, in general, a synchronous repeater of the "Selsyn" or "Autosyn" type comprises a field coil, normally fixed, and an armature pivoted to rotate within the field of said field coils. This repeater is connected by standard three-phase connections to a transmitter of identical construction. As the transmitter armature is rotated, it causes a corresponding rotation of the field induced in the field coils and this rotation is likewise transmitted to the field set up by the field coils of the repeater. Due to this field rotation at the repeater, the repeater armature rotates and "follows" the rotation of the transmitter armature, the two being in step, or synchronous, at all times.

It will be clear that this repeater action is a relative rotation only. For example, if the field coils, or casing, of a "Selsyn" repeater is rotatably mounted about an axis coincident with its armature axis and said casing is rotated at the same time that the armature is repeating rotations of the transmitter armature, then the repeater armature rotations will equal the algebraic sum of the rotations of transmitter armature and repeater casing or field coils. For instance, suppose that, with the repeater field coils stationary, the repeater armature is driven from the transmitter at 30 R. P. M. in one sense of rotation. Now suppose that the repeater fields coils are themselves rotated in the opposite sense at 30 R. P. M. Obviously, the repeater armature will then become stationary. Or if the field coils are rotated in the same sense at 30 R. P. M., the repeater armature will have a rotation of 60 R. P. M. In this respect, the Selsyn repeater acts as a frictionless differential.

The function of the several "Selsyns" of Figure 3 will now be obvious. As a simple illustration, take the case previously mentioned, where the craft is flying north at 200 miles per hour and there is a northerly wind of 30 miles per hour, so that the ground speed of the craft is 170 miles per hour. Now transmitter 18, Figure 1, which is connected to drive repeater 19a, Figure 3, is rotating the armature of 19a relatively to its casing or field coils at a rate that will cause screw 21a to move the stylus or indicator over the map or chart so that, if continued for one hour, the said stylus will have moved over the map, a distance corresponding to 200 miles to the scale of the chart. On the other hand, as the craft has only moved 170 miles relatively to the earth during that hour, there will be an error of 30 miles unless corrected. However, with applicant's corrector, friction wheel 62 has been moved radially of disc 60 such that transmitter 71 and its controlled repeater 74 rotate casing 19a and its attached field coils at a rate corresponding to 30 miles per hour and in the reverse direction from the direction of rotation of the armature of 19a relatively to its casing or field coils. Thus the net rotation of shaft 21a corresponds to 170 miles per hour and the stylus or indicator indicates or records the correct position at all times. Obviously the east-west corrector mechanism consisting of disc 61, transmitter 73, repeater 75 and rotatably mounted repeater casing 35a, act in exactly the same way to correct for east-west components of wind. In short, by applicant's construction, the air speed is resolved in N-S and E-W components, the wind velocity is resolved in N-S and E-W components, the two N-S components are algebraically added at repeater 19a, the two E-W components are algebraically added at 35a, and the two resultant components are recombined by screws 21a and 36a to give the actual travel of the craft over the earth correct both in direction and amount.

As long as the pointer 67 of the velocity compensating device is positioned on the axis of the polar chart 76, the point of contact of the wheels 62 and 63 are coincident with the axes of the discs 60 and 61, respectively, so that the Selsyn motors 71 and 73 are not rotated.

Supposing that the craft is moving northward as heretofore mentioned and is moving into a northwest wind, the pointer 67 would be moved along one of the radial lines on the polar chart in the direction of the wind velocity, the circular lines representing wind velocity from zero at the axis of the chart to whatever maximum is desired at the perimeter of the polar chart. Therefore, when the pointer 67 is moved in a northwesterly direction on the polar chart 76 the wheel 63 will be moved radially from the axis of the disc 61 a distance determined by the cosine of the angle of movement of the pointer 67 while the wheel 62 will be moved radially upon the disc 60 according the sine of the angle, whereby the speeds of rotation of the wheels 62 and 63 will be proportional to the wind velocity or compensating the Selsyn motors 19a and 35a, respectively. The movement of the wheels 62 and 63 upon the discs 60 and 61 will always be proportioned according to the trigonometric function of the angle established by the pointer 67 when moved from its point of origin regardless of which quadrant the pointer 67 is positioned within.

There is a further compensation that should also be made upon the navigating instrument disclosed in Fig. 1, that is a compensation for the vertical movement of the craft so that the vertical movement will not be transformed into a horizontal component by the navigating instrument and thus introduce air into the total mileage covered by the craft. In Figs. 4 and 5 there is shown such a compensating device. This device consists of a sphere 80 that is driven by a shaft 81 connected to a tachometer or other suitable speed sensitive instrument whereby the sphere 80 is driven at a speed proportional to the forward speed of the craft. A planimeter type wheel 82 is bearinged in a yoke 83 and is in engagement with the sphere 80 to be driven thereby and thus to drive a worm 13a that drives a gear 14a of the navigating instrument, and could be substituted for the worm 13 and gear 14 of Figure 1. When the device is in the position as shown in Fig. 4 the wheel 82 is being driven at maximum speed and the craft is being maintained in horizontal position.

If the craft should be moved off the horizontal position in either rise or decline, the yoke 83 will swing about the sphere 80 to move the wheel 82 toward the axis of rotation of the sphere thereby causing the worm 13a to be rotated at a lesser speed and thus drive the navigating instrument at a lesser speed to compensate for the reduced forward movement of the craft. While the speed of the craft may be the same as before, yet its forward movement will be less. Therefore, the plotting instrument will be corrected and the true forward movement of the craft will be indicated thereon.

The navigating instrument disclosed in Fig. 1 can also be used to transmit the location of the craft to a home base. In this instance, the shafts 17 and 33 of the device shown in Fig. 1 would carry intermittent contactors 85 and 86, see Fig. 6. The contactor 85 actuates a circuit closing blade 87 that is adapted to close a circuit to the frequency oscillator A or the frequency oscillator B depending upon the direction of rotation of the contactor 85. The direction of rotation of the contactor 85 is regulated by the direction of rotation of the shaft 17, and therefore, one of the frequency oscillators will be operated when the craft is moving in a northerly direction and the other frequency oscillator will be operated when the craft is traveling in a southerly direction.

Similarly, the intermittent contactor 86 is adapted to contact a circuit closing blade 88 for energizing the frequency oscillators C and D according to the direction of rotation of the shaft 33 for transmitting easterly or westerly directions of movement of the craft. The oscillations are conducted to a conventional transmitter that may be provided with the usual high frequency carrier wave.

From the foregoing operation of the device disclosed in Fig. 1, it will be apparent that the oscillations will be transmitted intermittently from the transmitter and at a speed of intermittence depending upon the speed of rotation of the shaft carrying the contactors 85 and 86.

It is understood, of course, that only one of the oscillators is operating for each of the shafts 17 and 33 at any one time depending upon the direction of rotation of the intermittent contactor. Therefore, there are two oscillations that are sent from the transmitter.

A suitable receiver is provided for receiving the transmissions of the transmitter and is provided with a conventional demodulator for separating the carrier from the oscillated frequency. Tuned circuits A', B', C', and D' are connected with the receiver and are tuned to the frequency generated by the oscillators A, B, C, and D, whereby the circuit contactors a, b, c, and d are closed when the oscillation is received by the receiver to which the circuits have been tuned.

The contactors a, b, c, and d are adapted to close circuits for the solenoids a', b', c' and d' to actuate armatures thereof and engage rachets 89, 90, 91 and 92, the ratchets 89 and 90 being provided on the shaft 21a for the plotting table 20 and the ratchets 91 and 92 being carried upon the shaft 36a for the plotting table 20. The cooperating ratchets on the shafts are adapted to rotate them in opposite directions when the actuating solenoids are energized.

The operation of the navigating instrument of Fig. 1 is not changed in any way when associated with the system disclosed in Fig. 6.

Assuming that the intermittent contactors 85 and 86 are rotating in a clockwise direction they are intermittently energizing the oscillators A and C. These oscillations are carried to the transmitter and transmitted to the receiver by modulated high frequency over a suitable carrier wave if desired. The transmissions are received by the receiver and the demodulator separates the oscillated frequency from the carrier so that the tuned circuits A' and C' can be energized by the signals initiated by the oscillators A and C. When the circuits A' and C' are energized, the contactors a and c are energized to close circuits to the solenoid a' and c', whereby the ratchets 89 and 91 rotate their respective shafts. Depending upon the speed of rotation of the shafts 17 and 33 of the navigating instrument, the speed of rotation of the ratchets 89 and 91 is controlled so that the plotting pointer 25 will be moved in a vector determined by the operation of the navigating instrument as hereinbefore described.

While the apparatus herein disclosed and described constitutes a preferred form of the invention, it is to be understood that the apparatus is capable of mechanical alteration without departing from the spirit of the invention and that such mechanical arrangements as fall within the scope of the appended claims are intended to be included herein.

Having thus fully described my invention, what I claim as new and desire to secure by Letters Patent is:

1. In a navigating instrument the combination of, rotatable disc means adapted to be driven at a speed proportional to the forward speed of the craft upon which the instrument is located, a pair of wheels driven by said disc means and movable radially thereof, crank means adapted to be retained in stationary position in space having crank arms thereon disposed 90° with respect to one another, gear means on said crank arms, gear means pivotally mounted adjacent said first mentioned gear means and in engagement therewith, a pantograph link mechanism interconnecting said gear means disposed relative to the path of travel of said wheels across said disc means so that a line through the axes of cooperating gears remains parallel to the path of travel of said wheels, and means connecting one of said gear means of each cooperating pair to a respective one of said wheels, whereby said wheels are moved across the face of said disc means in accordance with the trigonometric function of the angle of deflection of said crank arm with respect to the path of travel of said wheels.

2. In a navigating instrument the combination of, a rotatable disc means adapted to be driven at a speed proportional to the forward speed of the craft upon which the instrument is located, a pair of wheels driven by said disc means and movable radially across the face thereof, crank means adapted to be retained in stationary position in space having crank arms thereon disposed 90° with respect to one another, gear means on said crank arms, gear means pivotally mounted adjacent said first mentioned gear means and in engagement therewith, a pantograph link mechanism interconnecting said gear means disposed relative to the path of travel of said wheels across said disc means so that a line through the axes of cooperating gears remains parallel to the path of travel of said wheels, means connecting each one of said gear means of each cooperating pair to a respective one of said pair of wheels, whereby said wheels are moved across the face of said disc means in accordance with a trigonometric function of the angle of deflection of said crank arm with respect to the path of travel of said wheel, and independent means connecting said pair of wheels to a plotting mechanism for actuating the apparatus thereof that forms the ordinate and abscissa for a plotting device.

3. A navigating instrument comprising a pair of rotatable surfaces adapted to be rotated at a predetermined speed, wheels engaging each of said surfaces and movable radially across said surfaces, means driven by said wheels adapted to connect to a mechanism for transmitting the speed of rotation of said wheels, gear means, arms supporting the gear means and disposed at right angles to one another, gear means cooperating with said first mentioned gear means having arm means for supporting the same thereadjacent, link means interconnecting said gear means forming a pantograph mechanism with the arm means associated with said cooperating gear means to so dispose the same with respect to the path of travel of said wheels across said surfaces that a line through the axes of cooperating gear means remains parallel with the path of travel of said wheels, means connecting one of said gears of the cooperating gear means with one of said wheels for disposing one of said wheels adjacent the periphery of its cooperating rotating surface when said other wheel is disposed with its point of contact upon its cooperating rotating surface coincident with the axis of rotation thereof, and a mechanism associated with said navigating instrument for compensating the same for the velocity of movement of the medium through which a craft is traveling including a second pair of rotatable surfaces driven at a constant speed, means driven by said second surfaces and differentially connected to the means driven by said wheels respectively, and means for positioning the means driven by said second surfaces for driving them in proportion to the trigonometric function of the angle of movement of the medium with respect to predetermined angularly related directions respectively.

4. A navigating instrument comprising a pair of rotatable surfaces adapted to be rotated at a constant speed, wheel means engaging each of said surfaces and movable radially across said surfaces, means driven by said wheel means adapted to connect to a mechanism for transmitting the speed of rotation of said wheel means, gear means, arms supporting the gear means and disposed at right angles to one another and adapted to be stationarily positioned in space, gear means cooperating with said first mentioned gear means having arm means for supporting the same thereadjacent, link means interconnecting said gear means forming a pantograph mechanism with the arm means associated with said cooperating gear means to dispose the same with respect to the path of travel of said wheel across said surfaces that a line through the axes of cooperating gear means remains parallel with the path of travel of said wheel, means connecting one of said gears of the cooperating gear means with one of said wheels for disposing one of said wheels adjacent the periphery of its cooperating rotating surface when said other wheel is disposed with its point of contact upon its cooperating rotating surface coincident with the axis of rotation thereof, and means for driving said surfaces including means to change the speed of rotation of said surfaces when the craft upon which the instrument is located deviates from the horizontal.

5. A navigating instrument comprising in combination, a pair of rotatable surfaces, means for driving said surfaces at a constant speed, means driven by said surfaces and movable radially thereover, crank means having arms thereon disposed at a right angle to one another, gear means on each of said arm means, gear means associated with each of said first mentioned gear means and carried upon arms rotatably mounted adjacent said crank arms, link means interconnecting cooperating pairs of said gear means forming a pantograph mechanism with said arms associated with said cooperating gear means to dispose a line through the axes of cooperating gear means parallel with the line of travel of said means driven by said surfaces radially across the same, and means connecting said surface driven means to said second mentioned gear means of each of said cooperating pair of gear means to dispose one of said surface driven means adjacent the periphery of its driving surface when the other of the surface driven means is disposed with its point of contact thereon coincident with the axis of the surface, said means driven by said surfaces being adapted for connection to actuate position plotting mechanism.

6. A navigating instrument comprising in combination, a pair of rotatable surfaces, means for driving said surfaces at a constant speed, means driven by said surfaces and movable radially thereover, crank means having arms thereon disposed at a right angle to one another, gear means on each of said arm means, gear means associated with each of said first mentioned gear means and carried upon arms rotatably mounted adjacent said crank arms, link means interconnecting cooperating pairs of said gear means forming a pantograph mechanism with said arms associated with said cooperating gear means to dispose a line through the axes of cooperating gear means parallel with the line of travel of said means driven by said surfaces radially across the same, means connecting said surface driven means to said second mentioned gear means of each of said cooperating pair of gear means to dispose one of said surface driven means adjacent the periphery of its driving surface when the other of the surface driven means is disposed with its point of contact thereon coincident with the axis of the surface, and a directional control means connected to said crank means for retaining the same stationary in space whereby said second gear means rotates about said first gear means to move said surface driven means over their cooperating surfaces in accordance with the trigonometric function of the angle of deviation of the second mentioned gear means with respect to its former position, said means driven by said surfaces being adapted for connection to actuate position plotting mechanism.

7. A navigating apparatus comprising in combination, a pair of rotatable surfaces adapted to be driven at a constant speed, a first means and a second means driven by said surfaces each being movable independently and radially over its respective surface, a pantograph mechanism connected to each of said first and second means for moving said first and second means across said rotatable surfaces, means for actuating said pantograph mechanisms for moving said first and second means in opposite directions upon said surfaces, and means connected to be driven by said first and second means for actuating a plotting mechanism.

8. A navigating apparatus comprising in combination, a pair of rotatable surfaces, first and second means engaging said surfaces respectively and movable radially thereover and driven thereby, a pair of pantograph mechanisms connected in 90° angular relation engaging said first and second means respectively for moving the same across said surfaces, means for simultaneously actuating said pantograph mechanisms for thereby moving said first and second means in straight line movement over said surfaces, and means connected to be driven by said first and second means respectively for actuating a plotting mechanism.

9. A navigating apparatus comprising in combination, a pair of rotatable surfaces, a source of power, independent means engaging said surfaces movable radially thereover and driven thereby, a pair of pantograph mechanisms disposed 90° out of phase engaging said independent means for moving the same across said surfaces, means for simultaneously actuating said pantograph mechanisms for thereby moving said independent means in straight line direction upon said surfaces, means drivingly connected to said independent means for actuating a plotting mechanism, and a drive from said source of power to said surfaces including gravity-controlled variable-speed mechanism responsive to a change in the horizontal position of a craft carrying a navigating apparatus for changing the speed of rotation of said surfaces to compensate therefor.

10. A navigating apparatus comprising in combination, a pair of rotatable surfaces, independent means engaging said surfaces movable radially thereover and driven thereby, a pair of pantograph mechanisms disposed 90° out of phase engaging said independent means for moving the same across said surfaces, means for simultaneously actuating said pantograph mechanisms for thereby moving said independent means in opposite directions upon said surfaces, independent electric circuit interrupter means connected to said independent means and driven thereby, oscillator means actuated by said interrupter means, wireless transmission means for transmitting oscillations when produced by said interrupter means, wireless receiver means having circuits tuned to the oscillations of said oscillators, and means actuated by said tuned circuits for actuating a plotting mechanism.

11. A navigating apparatus comprising in combination, a pair of rotatable surfaces, independent means engaging said surfaces movable radially thereover and driven thereby, a pair of pantograph mechanisms disposed 90° out of phase engaging said independent means for moving the same across said surfaces, means for simultaneously actuating said pantograph mechanisms for thereby moving said independent means in opposite directions upon said surfaces, independent electric circuit interrupter means connected to said independent means and driven thereby, oscillator means actuated by said interrupter means, wireless transmission means for transmitting oscillations when produced by said interrupter means, wireless receiver means having circuits tuned to the oscillations of said oscillators, and ratchet mechanisms actuated by said tuned circuits for operating a plotting mechanism.

12. In a navigation instrument, a rotatable disc, a wheel radially adjustable over said disc in contact therewith and connected to drive a course plotting mechanism along one direction component of movement, means for so adjusting said wheel comprising a first crankshaft, a first gear on the crank thereof, a second crankshaft, a second gear on the crank of said second crankshaft, said gears intermeshing, means connecting said cranks for conjoint rotation, and a connection between said wheel and said second gear, for so radially adjusting said wheel.

13. In a navigation instrument, a rotatable disc, a wheel radially adjustable over said disc in contact therewith and connected to drive a course plotting mechanism along one direction component of movement, means for so adjusting said wheel comprising a first crankshaft, a first gear on the crank thereof, a second crankshaft, a second gear on the crank of said second crankshaft, said gears intermeshing, means connecting said cranks for conjoint rotation, and means for rotating said first crankshaft according to the heading of the craft for which the device is intended.

14. In a correction device for navigational instruments for a craft, a screw, a plotter connected to be driven by rotation of said screw, a first repeater having relatively rotatable armature and field coil elements one of which is connected to rotate said screw, means rotatably mounting the other of said elements, a second repeater connected to rotate said other element of said first repeater, and a device integrating the velocity of the medium in which said craft travels with respect to time and connected to so rotate said second repeater.

15. In a navigational instrument, a device adapted to integrate velocity with respect to time, a driving disc, means rotating said disc at a speed proportional to the speed of a craft, a wheel radially shiftable over and in contact with said disc, two crank means having parallel axes of rotation adjacent said disc, means connecting said crank means for synchronous rotation, two interengaging gear means, each on a respective crank of said crank means, one of said crank means being adjusted in accordance with the heading of said craft, and means connected to the gear means on the other crank means to so radially shift said wheel whereby said wheel is driven at a rate proportional to a predetermined component of movement of said craft.

16. In a navigational instrument, a device adapted to integrate velocity with respect to time, a driving disc, means rotating said disc at a speed proportional to the speed of a craft, a wheel radially shiftable over and in contact with said disc, two crank means having parallel axes of rotation adjacent said disc, means connecting said crank means for synchronous rotation, two interengaging gear means, each on a respective crank of said crank means, one of said crank means being adjusted in accordance with the heading of said craft, means connected to the gear means on the other crank means to so radially shift said wheel whereby said wheel is driven at a rate proportional to a predetermined component of movement of said craft, means for driving said disc, and a driving connection between said driving means and disc comprising a substantially spherical element rotatable about a first diameter, a pendulous yoke pivoted on a second diameter at an angle to said first diameter, and a wheel pivoted in said yoke and in engagement with said spherical element.

17. A navigating instrument comprising a pair of rotatable surfaces adapted to be rotated at a constant speed, first and second wheels engaging said surfaces respectively and movable radially across said surfaces, means driven by said wheels adapted to be connected to a mechanism for transmitting the speed of rotation of said wheels, first gear means carried upon first arms disposed at right angles to one another and adapted to be stationarily positioned in space, second gear means, second arms supporting said second gear means in mesh with said first gear means, link means interconnecting said gear means and forming a pantograph mechanism with said first and second arm means and associated with said first and second gear means to dispose the same so that a line through the center of said first and second gear means remains parallel with the path of travel of said wheel, and means connecting said second gear means with the respective wheels for disposing one of said wheels adjacent the periphery of its cooperating rotating surface when the other said wheel is disposed with its point of contact upon its cooperating rotating surface coincident with the axis of rotation thereof.

MARION E. SOHN.